US008489740B2

(12) United States Patent
Schneider

(10) Patent No.: US 8,489,740 B2
(45) Date of Patent: *Jul. 16, 2013

(54) METHOD AND AN APPARATUS TO GENERATE MESSAGE AUTHENTICATION CODES AT A PROXY SERVER FOR VALIDATING A WEB SESSION

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1069 days.

This patent is subject to a terminal disclaimer.

(21) Appl. No.: 11/879,723

(22) Filed: Jul. 17, 2007

(65) Prior Publication Data
US 2008/0289025 A1   Nov. 20, 2008

Related U.S. Application Data

(63) Continuation-in-part of application No. 11/804,683, filed on May 18, 2007.

(51) Int. Cl.
*G06F 15/173* (2006.01)

(52) U.S. Cl.
USPC .......................................... 709/225; 709/223

(58) Field of Classification Search
USPC ................................. 709/225, 223
See application file for complete search history.

(56) References Cited

U.S. PATENT DOCUMENTS

| 6,163,844 | A | 12/2000 | Duncan et al. |
|---|---|---|---|
| 6,321,267 | B1 | 11/2001 | Donaldson |
| 6,467,086 | B1 | 10/2002 | Kiczales et al. |
| 6,473,895 | B1 | 10/2002 | Lopes et al. |
| 6,539,390 | B1 | 3/2003 | Kiczales et al. |
| 6,571,295 | B1 | 5/2003 | Sidana |
| 6,591,266 | B1 | 7/2003 | Li et al. |
| 7,140,007 | B2 | 11/2006 | Lamping |
| 7,149,510 | B2 | 12/2006 | Hansson |
| 7,810,082 | B2 | 10/2010 | Levenshteyn |
| 7,881,304 | B2 | 2/2011 | Schneider |
| 8,103,607 | B2 | 1/2012 | Schneider |
| 8,180,854 | B2 | 5/2012 | Schneider |
| 2002/0087661 | A1 | 7/2002 | Matichuk et al. |
| 2002/0099936 | A1* | 7/2002 | Kou et al. .................... 713/151 |
| 2002/0138589 | A1 | 9/2002 | Al-Kazily et al. |
| 2003/0014628 | A1 | 1/2003 | Freed et al. |

(Continued)

OTHER PUBLICATIONS

Office Action dated Jun. 19, 2009 for related U.S. Appl. No. 11/804,683, filed May 18, 2007, 15 pages.

(Continued)

*Primary Examiner* — Dustin Nguyen
*Assistant Examiner* — Joel Mesa
(74) *Attorney, Agent, or Firm* — Lowenstein Sandler LLP

(57) ABSTRACT

Some embodiments of a method and an apparatus to validate a web session in a proxy server have been presented. In one embodiment, a first message authentication code is generated at a proxy server communicatively coupled between an application server and a client upon receiving a message from the application server. The message is generated by the application server in response to an authentication request from the client to initiate a web session. The proxy server then adds the first message authentication code and one or more timestamps to the message. Then the proxy server may send the message to the client, wherein the client may use the first message authentication code and the one or more timestamps to request access to predetermined content during the web session.

25 Claims, 6 Drawing Sheets

U.S. PATENT DOCUMENTS

| | | | |
|---|---|---|---|
| 2004/0187083 A1 | 9/2004 | Tracey et al. | |
| 2005/0091374 A1 | 4/2005 | Ganesan et al. | |
| 2006/0026286 A1 | 2/2006 | Lei et al. | |
| 2006/0080546 A1* | 4/2006 | Brannon et al. | 713/185 |
| 2006/0149550 A1 | 7/2006 | Salminen | |
| 2006/0168199 A1 | 7/2006 | Chagoly et al. | |
| 2006/0184410 A1 | 8/2006 | Ramamurthy | |
| 2006/0288091 A1 | 12/2006 | Oh et al. | |
| 2007/0006291 A1* | 1/2007 | Barari et al. | 726/10 |
| 2007/0022141 A1 | 1/2007 | Singleton et al. | |
| 2007/0022409 A1 | 1/2007 | Levenshteyn | |
| 2007/0162246 A1 | 7/2007 | Barcia et al. | |
| 2007/0283317 A1 | 12/2007 | Sadler et al. | |
| 2008/0034372 A1 | 2/2008 | Ganesan et al. | |
| 2008/0109276 A1 | 5/2008 | Ionfrida et al. | |
| 2008/0235352 A1 | 9/2008 | Yolleck et al. | |
| 2008/0282233 A1 | 11/2008 | Sheppard et al. | |
| 2008/0288648 A1 | 11/2008 | Schneider | |
| 2009/0019133 A1 | 1/2009 | Brimley | |
| 2009/0132220 A1 | 5/2009 | Chakraborty et al. | |
| 2009/0158244 A1 | 6/2009 | Foumani | |
| 2009/0171733 A1 | 7/2009 | Bobak et al. | |
| 2009/0299938 A1 | 12/2009 | Schneider | |
| 2009/0300099 A1 | 12/2009 | Schneider | |

OTHER PUBLICATIONS

Advisory Action for U.S. Appl. No. 11/804,683 mailed Jan. 27, 2010.
Final Office Action for U.S. Appl. No. 11/804,683, mailed Nov. 16, 2009.
Notice of Allowance dated Sep. 17, 2010 for U.S. Appl. No. 12/129,584.
Office Action dated Feb. 5, 2010 for U.S. Appl. No. 12/129,584.
Final Office Action dated Apr. 16, 2010 for U.S. Appl. No. 12/129,584.
Largaisse, B. and Joose, W., "True and Transparent Distributed Composition of Aspect-Components," Middleware, 2006, pp. 42-61.
Win, Bart D., et al., Report on the Workshop on AOSD Technology for Application-Level Security (AOSDSEC), Report TW 387, Jun. 2005.
Navarro, L.D. et al., "Explicitly distributed AOP usingA WED", Proc. Of 5$^{th}$ Int'l Conf. on Aspect-Oriented Software Development, (Bonn, Germany, Mar. 20-24, 2006, pp. 51-62.
Nishizawa, M., et al., "Remove ponitcut: a language construct for distributed AOP", *Proc. Of 3$^{rd}$ Int'l Conf. on Aspect-Orient Software Development* (Lancaster, UK, Mar. 22-24, 2004), pp. 7-15.
Zdun, Uwe, "Tailorable language for behavioral composition and configuration of software components", *Computer Languages, Systems & Structures*, vol. 32, Issue 1, Apr. 2006, pp. 56-82.
Office Action for U.S. Appl. No. 12/129,670, mailed Nov. 10, 2009.
Final Office Action for U.S. Appl. No. 12/129,670, mailed May 13, 2010.
Fielding, et al., "Hypertext Transfer Protocol—HTTP/1.1", The Internet Society, Jun. 1999, 114 pages.
Krawczyk, et al., "HMAC: Keyed-Hashing for Message Authentication", Feb. 1997, 11 pages.
Song, et al., "The Advanced Encryption Standard-Cipher-based Message Authentication Code-Pseudo-Random Function-128 (AES-CMAC-PRF-128) Algorithm for the Internet Key Exchange Protocol (IKE)", The Internet Society, Aug. 2006, 7 pages.
Rescorla, E., "HTTP Over TLS", The Internet Society, May 2000, 7 pages.
Dierks, et al., "The Transport Layer Security (TLS) Protocol", The Internet Society, Apr. 2006, 82 pages.
Franks, et al., "HTTP Authentication: Basic and Digest Access Authentication", The Internet Society, Jun. 1999, 32 pages.
Torvinen, et al., "Hypertext Transfer Protocol (HTTP) Digest Authentication Using Authentication and Key Agreement (AKA) Version-2", The Internet Society, Nov. 2005, 13 pages.
Office Action for U.S. Appl. No. 11/804,683, mailed Nov. 16, 2009.
Office Action for U.S. Appl. No. 11/804,683, mailed Mar. 30, 2011.
Notice of Allowance for U.S. Appl. No. 11/804,683, mailed Sep. 17, 2010.
Office Action for U.S. Appl. No. 11/804,683, mailed Sep. 15, 2011.
Office Action for U.S. Appl. No. 12/129,668, mailed Jun. 3, 2011.
Notice of Allowance for U.S. Appl. No. 12/129,668, mailed Sep. 20, 2011.
Office Action for U.S. Appl. No. 12/129,670, mailed May 13, 2010.
Notice of Allowance for U.S. Appl. No. 12/129,670, mailed Jan. 4, 2012.
USPTO; Office Action for U.S. Appl. No. 11/804,683, mailed Jul. 11, 2012.

* cited by examiner

METHOD AND AN APPARATUS TO GENERATE MESSAGE AUTHENTICATION CODES AT A PROXY SERVER FOR VALIDATING A WEB SESSION

This is a continuation-in-part application of application Ser. No. 11/804,683, filed May 18, 2007, which is hereby incorporated by reference.

TECHNICAL FIELD

Embodiments of the present invention relate to web sessions, and more specifically to validating a web session in a proxy server.

BACKGROUND

As the use of the Internet is becoming more popular, more web applications are deployed. An application as used herein generally refers to a program or a suite of programs executable by one or more processors to perform tasks and/or functions. A web application broadly refers to an application accessible with a network access application (e.g., a browser) over a network (e.g., an intranet, the Internet, etc.). The web application is typically executed on a web server at the back-end, while the network access application acts as a client (also referred to as a thin client) at the front end. One conventional practice in providing web applications is to use a proxy server (also referred to as a web proxy) to interface between a browser and a web server. The proxy server may forward requests and/or responses between application servers and browsers on different client machines. A series of interactions between an application server and a browser may be referred to as a web session. A web session is typically initiated by a user of the browser logging in and terminated by the user logging out.

Having the proxy server to provide a middle layer between the application servers and clients running browsers allows changing the application servers, adding application servers, removing application servers, and/or partitioning different kinds of requests from the clients to different application servers. However, as the content served by the application servers gets more complex, the application servers may become overloaded.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
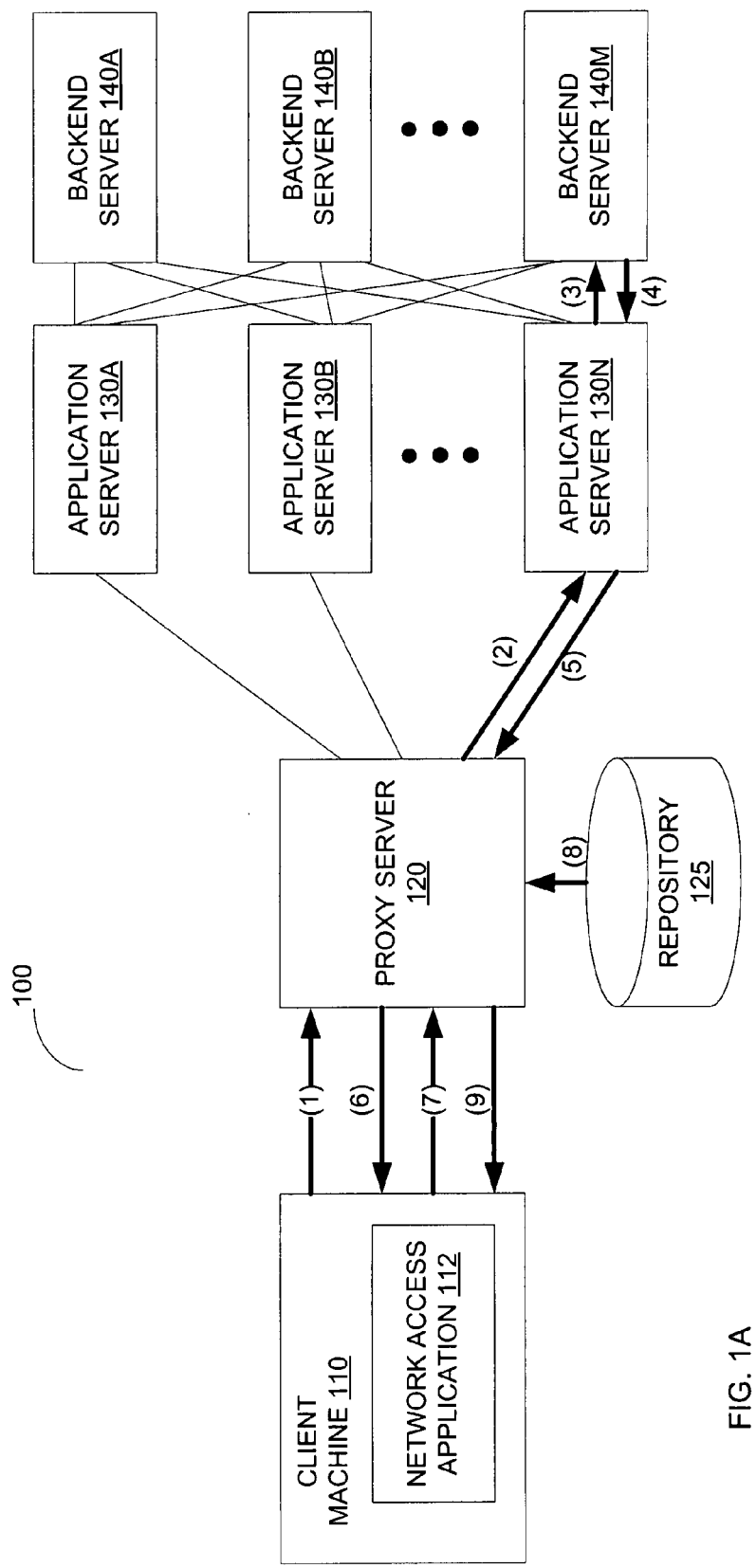
FIG. 1A illustrates one embodiment of a system in which embodiments of the present invention may be implemented.

Described herein are some embodiments of a method and an apparatus to validate a web session in a proxy server. In one embodiment, a first message authentication code is generated at a proxy server communicatively coupled between an application server and a client upon receiving a message from the application server. The message is generated by the application server in response to an authentication request from the client to initiate a web session. The proxy server then adds the first message authentication code and one or more timestamps to the message. Then the proxy server may send the message to the client, wherein the client may use the first message authentication code and the one or more timestamps to request access to predetermined content during the web session. Content as used herein broadly refers to material accessible over a network (e.g., an intranet, the Internet, etc.), which may include one or more of various types of data, such as textual data, graphic data, audio data, and video data, etc. In general, content that remains substantially unchanged throughout a web session is referred to as static content. On the contrary, content that may change during a web session, may change from session to session, and/or may be generated only upon request, etc., is referred to as dynamic content. In some embodiments, the predetermined content includes static content. More details of some embodiments of the validation of web sessions in the proxy server are described below.

n the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a system in which embodiments of the present invention may be implemented. The system 100 includes a client machine 110, a proxy server 120, a repository 125, a number of application servers 130A-130N, and a number of backend servers 140A-140M. Each of the backend servers 140A-140M typically provides a specific type of service. Some examples of the backend servers 140A-140M include a database server, a payment gateway processor, a legacy mainframe application server, etc. The application servers 130A-130N may communicate with one or more of the backend servers 140A-140M, such as to send data to or to retrieve data from the backend servers 140A-140M. The client machine 110 is coupled to the proxy server 120, which is further coupled to the repository 125 and the various application servers 130A-130N. The client machine 110 may include a computing machine, such as a desktop personal computer (PC), a laptop PC, a personal digital assistant (PDA), a mobile telephone, etc. A network access application 112 (e.g., a browser, an electronic mail engine, etc.) is being executed on the client machine 110. Note that the network access application 112 may be simply referred to as "the client." The proxy server 120 may be implemented using a computing machine, such as the one illustrated in FIG. 4. The proxy server 120 is further coupled to the application servers 130A-130N. The application servers 130A-130N may communicate with the client machine 110 via the proxy server 120, which serves as a gateway. To illustrate the concept, an example involving the application server 130N is described in details below.

To initiate a web session with the application server 130N, the network access application 112 sends an authentication request (1) intended for the application server 130N to the proxy server 120. The proxy server 120 forwards the authentication request (2) to the application server 130N. Upon receiving the authentication request (2) from the proxy server 120, the application server 130N attempts to authenticate the network access application 112. One way to authenticate the network access application 112 is to use authentication information from a backend server. For instance, the network access application 112 may have included a user name and a password in the authentication request (2) and the application server 130N may access the backend server 140M (3), which is a database server, to retrieve a pre-established record having the same user name (4). Then the application server 130N may compare the user name and the password to the pre-established record to determine if there is a match. If there is a match, the network access application 112 is authenticated. Otherwise, the network access application 112 is not authenticated and the application server 130N may return an error message to the network access application 112 via the proxy server 120.

Figure 1B:
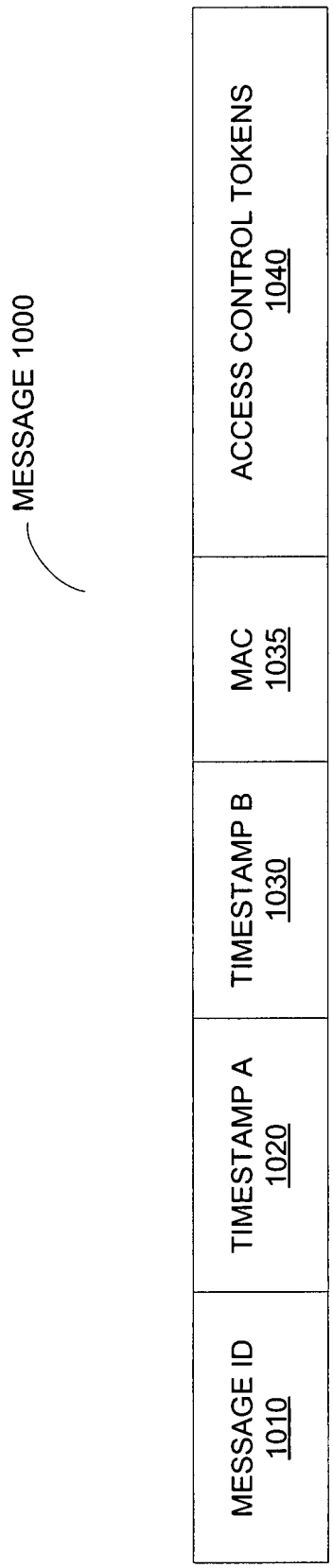
FIG. 1B illustrates one embodiment of a message from an application server to a client.

If the network access application 112 is authenticated, then the application server 130N may generate some information for authorizing the network access application 112 to access some predetermined content. For example, the network access application 112 may be executing a user interface of an online banking application of a bank and the authenticated network access application 112 is allowed to access the financial records of the user associated with the user name and password provided during authentication, but the network access application 112 is not allowed to access the financial records of other customers of the bank. In some embodiments, the application server 130N generates a message containing one or more access control tokens, adds one or more timestamps to the message, and computes a message authentication code (MAC) for the message. Alternatively, as shown in FIG. 1A, the application server 130N generates a message having a set of access control tokens (also simply referred to as tokens) and sends the message (5) to the proxy server 120. Then the proxy server 120 adds one or more timestamps to the message. The proxy server 120 further computes a MAC for the message and adds the MAC to the message. One embodiment of the message is illustrated in FIG. 1B. The message 1000 includes a unique message identifier 1010, a timestamp A 1020, a timestamp B 1030, a MAC 1035, and a set of access control tokens 1040 (or simply referred to as tokens). The message identifier 1010 identifies the message 1000. The timestamp A 1020 signifies when the message 1000 has been generated or when the message 1000 has reached the proxy server 120. The timestamp B 1030 signifies the time at which the message 1000 is no longer valid. The access control tokens 1040 indicates which type of contents the network access application 112 is allowed to access. The tokens can be provided as either part of a session identification cookie, as a separate cookie, or part of the universal resource locator (URL). In addition, the message 1000 may include other data from the application server 130N. The MAC 1035 of the message 1000 is a key for validating the web session later in the proxy server 120. The MAC 1035 may include a series of alphanumeric characters. In some embodiments, the MAC 1035 is generated in a way substantially similar to a cryptographic hash, in that the MAC 1035 is calculated from a particular message with which the MAC 1035 is sent. Note that the proxy server 120 may or may not store a copy of the access control tokens 1040, the timestamps 1020 and 1030, and the MAC 1035. If the proxy server 120 stores the entire collection of tokens 1040 and timestamps 1020 and 1030 along with the MAC 1035, there is no need for a MAC because any string that can uniquely identify the particular session may suffice. If the proxy server 120 does not store the tokens 1040, the timestamps 1020 and 1030, and the MAC 1035, the proxy server 120 may re-compute the MAC later in response to access requests from clients in order to validate the web session. More details of re-computation of the MAC are discussed below. Referring back to FIG. 1A, the proxy server 120 sends the MAC, a timestamp, and the tokens in the message (6) to the network access application 112. By moving the MAC computation from the application server 130N to the proxy server 120, there is no need for the application server 130N to have any knowledge of the MAC computation. Furthermore, the proxy server 120 does not have to rely on the application server 130N to provide a timestamp and a MAC.

In order to improve efficiency, the application server 130N may have offloaded the service of static content to the proxy server 120. In some embodiments, the static content is stored in the repository 125 accessible by the proxy server 120. However, the static content may contain information restricted to authorized users only. To protect the static content, the proxy server 120 controls access to the static content using the information generated during the authentication process described above.

Later in the web session, the network access application 112 may attempt to access the static content. In some embodiments, the network access application 112 sends an access request (7) to the proxy server 120 for the static content during the web session. The access request (7) contains the MAC, the timestamp, and the tokens previously obtained from the application server 130N and/or the proxy server 120 during authorization. The proxy server 120 may check the timestamp in the access request (7) to determine if the timestamp has expired yet. If the timestamp is not yet expired (i.e., still valid), the proxy server 120 may compute a new MAC based on the tokens and the timestamp in the access request (7) and compare the newly computed MAC with the MAC in the access request (7). If the newly computed MAC and the MAC in the access request (7) are different, then it is likely that some or all of the tokens in the access request (7) have been modified and/or omitted, or the timestamp in the access request (7) has been fudged. Otherwise, if the newly computed MAC and the MAC in the access request (7) match, then the MAC in the access request (7) is validated and the proxy server 120 may check the tokens in the access request (7) to determine if the network access application 112 is authorized to access the requested static content. More details of the tokens are discussed below.

In some embodiments, each of the tokens identifies a particular class of static content. If the network access application 112 attempts to access a certain class of static content without the proper token, the proxy server 120 denies access to the static content. The proxy server 120 may return an error message and/or a login page. On the other hand, if the network access application 112 has provided the proper token for the static content, then the proxy server 120 grants access to the static content to the network access application 112. In some embodiments, the proxy server 120 retrieves the static page (8) from the repository 125 and serves the static page (9) to the network access application 112.

In some embodiments, the proxy server 120 sends an updated set of credentials on every access request. The updated set of credentials may include an updated MAC, updated access control tokens, and/or updated timestamps. For example, if the access request is for static content, the proxy server 130 may simply update the timestamps. Note that if the proxy server 120 has to access the application server 130N in response to an access request, the proxy server 120 may or may not rely on the application server 130N to update the access control tokens.

In some embodiments, the proxy server 120 and/or the application server 130N provide a way to issue updated tokens since eventually the timestamp will expire before the web session is terminated. For instance, the proxy server 120 may create a new message using the tokens passed back by the network access application 112, with a new timestamp, calculate the MAC of this new message, and then pass the newly calculated MAC, the new timestamp, and the tokens in the new message back to the network access application 112 with an indication that this new message should replace the previous message. Alternatively, the proxy server 120 may rely upon the application server 130N to perform substantially the same operations as described above if it is unlikely that the network access application 112 would access only the static content, and not generate a request that gets handled by the application server 130N from time to time.

By offloading the service of static content to the proxy server 120, the service of static content may be faster than serving the static content from the application server 130N. Furthermore, the application server 130N may generate contents not offloaded to the proxy server 120 (e.g., dynamic content) faster because the application server 130N does not have to generate the static content. In addition, the above approach improves the efficiency of the service of web content without sacrificing security by providing access control at the proxy server 120 during the web session. After the network access application 112 has been authorized at the initiation of the web session, the proxy server 120 may authenticate access requests from the network access application 112 using the MAC and tokens generated by the application server 130N earlier. In other words, the proxy server 120 may perform lightweight authentication during the web session by reusing information generated at the initial authorization by the application server 130N. Details of one embodiment of the proxy server 120 are discussed below.

Figure 2:
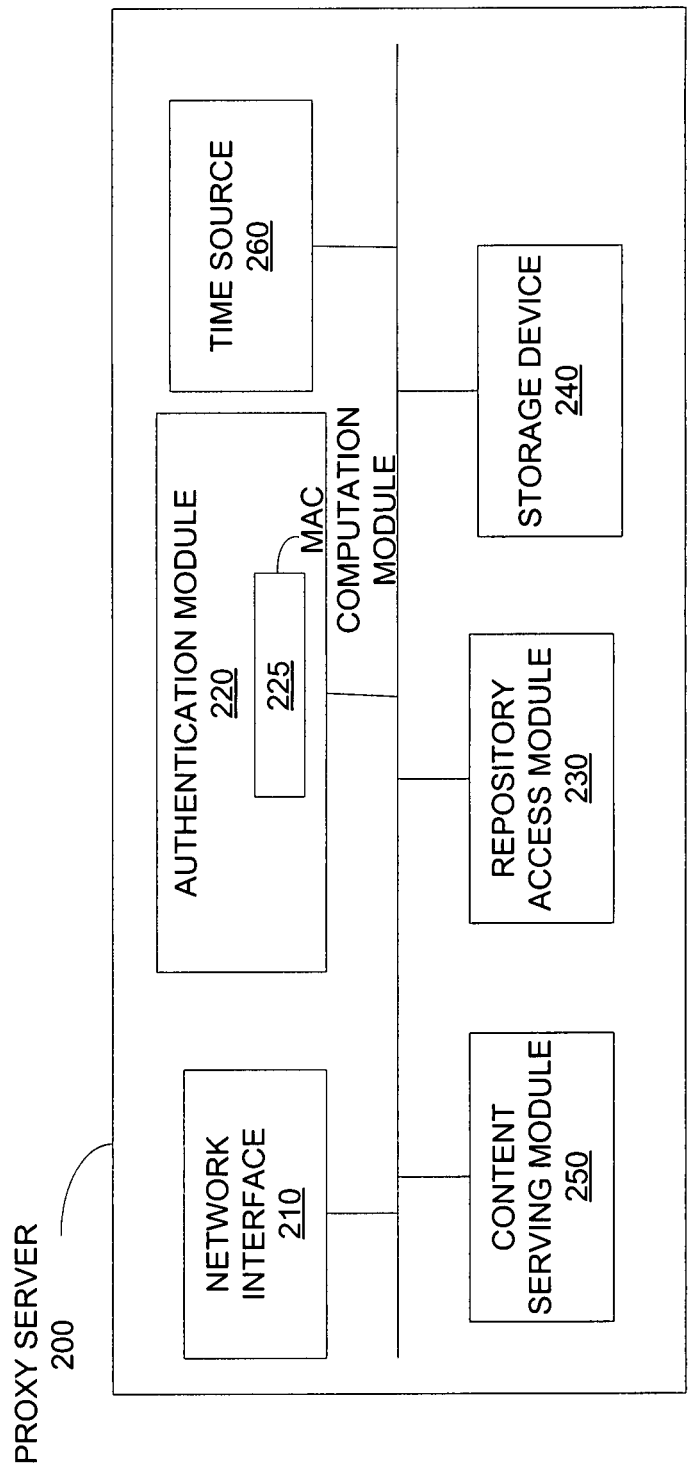
FIG. 2 illustrates a functional block diagram of one embodiment of a proxy server.

FIG. 2 illustrates a functional block diagram of one embodiment of a proxy server. The proxy server 200 may be implemented on a computing device, such as the one described with reference to FIG. 4. The proxy server 200 includes a network interface 210, an authentication module 220, a repository access module 230, a storage device 240, a content serving module 250, and a time source 260 (e.g., a clock), which are operatively coupled to each other. The authentication module 220 further includes a MAC computation module 225.

In some embodiments, the network interface 210 communicatively couples the proxy server 200 to a network, which may include a local area network (LAN), a wide area network (WAN), an intranet, the Internet, etc. Via the network, the network interface 210 receives an authentication request from a network access application running on a client machine. The authentication request is sent in an attempt to initiate a web session between the network access application and an application server. The proxy server 200 forwards the authentication request to the application server, which may authenticate the network access application. If the network access application is authenticated, the application server sends a message containing access control tokens to the proxy server 200. The proxy server 200 receives the message via the network interface 210, which forwards the message to the authentication module 220 within the proxy server 200. Using the time source 260, the authentication module 220 may add one or more timestamps to the message. Then the MAC computation module 225 within the authentication module 220 may compute a MAC for the message. The authentication module 220 may add the MAC to the message as well. Furthermore, a copy of the MAC may be stored in the storage device 240. One exemplary embodiment of the message is shown in FIG. 1B. Then the proxy server 200 sends the message to the network access application via the network interface 210. Alternatively, the application server may have already added one or more timestamps to the message, have computed a MAC for the message, and have added the MAC to the message as well before sending the message to the proxy server 200. If so, the proxy server 200 may simply forward the message from the application server to the network access application without modifying the message.

During the web session, the network access application may have to be authenticated again before accessing some predetermined content, and the proxy server 200, instead of the application server, may validate the on-going web session in order to authenticate the network access application again. In some embodiments, the network interface 210 of the proxy server 200 receives an access request from the network access application running on the client machine. The access request includes a timestamp, a previously obtained MAC, and a set of previously obtained tokens. The MAC and the tokens may be obtained at the initiation of the current web session from a backend server (e.g., an application server) and/or the proxy server 200 as described above.

In response to the request, the authentication module 220 authenticates the access request using the information contained within the request. The authentication module 220 may check the timestamp in the access request to determine if the timestamp has expired or not. If the timestamp has not yet expired, the MAC computation module 225 computes a second MAC using the tokens and the timestamp provided in the access request and compares the second MAC with the previously obtained MAC in the access request. If the second MAC matches the previously obtained MAC, the previously obtained MAC is valid and thus, the tokens are validated or authenticated. If the tokens are authenticated, then the authentication module 220 checks the tokens to determine if the network access application is authorized to access the requested content. If the network access application is not authorized, then the authentication module 220 denies access to the requested content. The authentication module 220 may send an error message and/or a login page to the network access application. Otherwise, the authentication module 220 serves the requested content to the network access application.

In some embodiments, the requested content is stored in a storage device 240 within the proxy server 200. The proxy server 200 may retrieve the requested content from the storage device 240 and send the requested content to the network access application via the network interface 210. Alternatively, the requested content is stored in a repository coupled to the proxy server 200. The repository access module 230 retrieves the requested content from the repository and then sends the requested content to the network access application via the network interface 210.

Figure 3A:
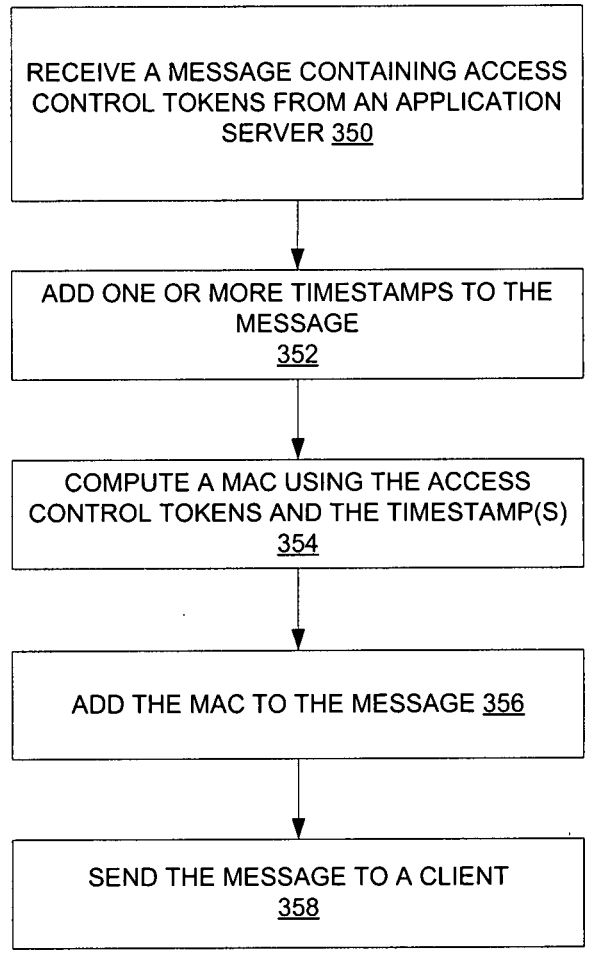
FIG. 3A illustrates a flow diagram of one embodiment of a process to initiate a web session using a proxy server.

FIG. 3A illustrates a flow diagram of one embodiment of a process to initiate a web session using a proxy server. The process may be performed by processing logic that may comprise hardware (e.g., circuitry, dedicated logic, programmable logic, microcode, etc.), software (such as instructions run on a processing device), firmware, or a combination thereof. For example, the proxy server 200 in FIG. 2 may perform the process in some embodiments.

In some embodiments, processing logic receives a message containing one or more access control tokens from an application server at a proxy server (processing block 350). The application server may have just authenticated a client at the initiation of a web session as described above. The access control tokens indicate the type of content, which the client is allowed to access. Then processing logic adds one or more timestamps to the message (processing block 352). For example, processing logic may add the timestamps using a time source (e.g., a clock) at the proxy server. Furthermore, processing logic computes a MAC using the access control tokens and the timestamps (processing block 354). Processing logic adds the MAC computed to the message (processing block 356). For instance, processing logic may concatenate the MAC to the message. Alternatively, processing logic may insert the MAC into a predetermined location of the message. Finally, processing logic sends the message, which contains the access control tokens, the timestamp(s), and the MAC, to a client (processing block 358). During the web session, the client may provides the access control tokens, the timestamp(s), and the MAC to the proxy server later in order to validate the web session as described below.

Figure 3B:
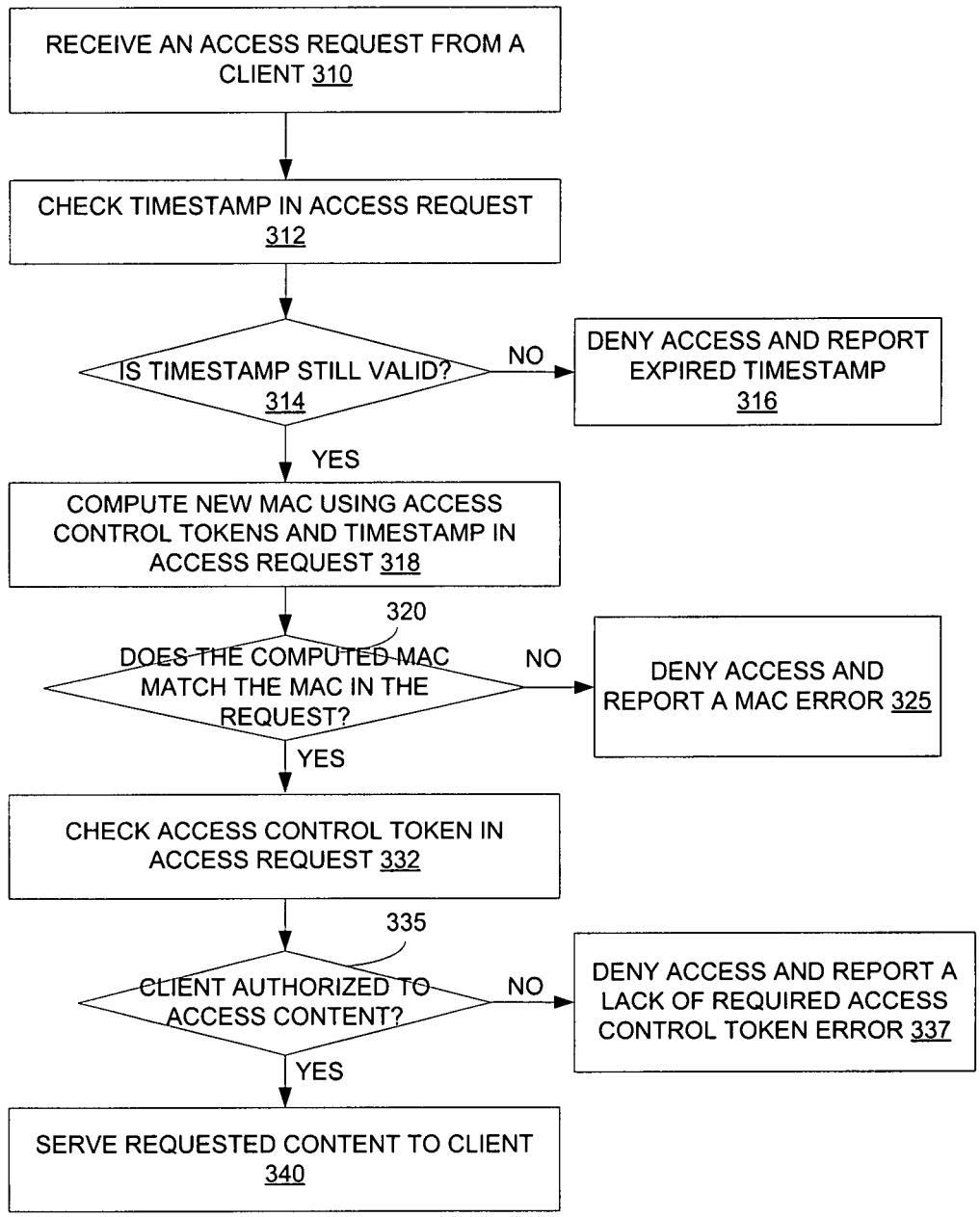
FIG. 3B illustrates a flow diagram of one embodiment of a process to validate a web session in a proxy server.

FIG. 3B illustrates a flow diagram of one embodiment of a process to validate a web session in a proxy server. The process may be performed by processing logic that may comprise hardware (e.g., circuitry, dedicated logic, programmable logic, microcode, etc.), software (such as instructions run on a processing device), firmware, or a combination thereof. For example, the proxy server 200 in FIG. 2 may perform the process in some embodiments.

In some embodiments, processing logic at the proxy server receives an access request from a client during a web session (processing block 310). For example, the client may request to access some static content. Although an application server may have authenticated the client earlier at the initiation of the web session as described above, processing logic at the proxy server has to authenticate the client again to ensure the client is authorized to access the requested content. Thus, processing logic at the proxy server performs the operations described below to authenticate the client again.

In some embodiments, processing logic checks a timestamp in the access request (processing block 312). Processing logic determines if the timestamp is still valid (processing block 314). If the timestamp is invalid, processing logic denies access and reports an expired timestamp error (processing block 316). Otherwise, processing logic continues the process at processing block 318. Processing logic computes a new MAC using access control tokens and the timestamp in the access request (processing block 318). Processing logic then determines if the previously obtained MAC in the access request matches the newly computed MAC (processing block 320). If the previously obtained MAC matches the newly computed MAC, then the previously obtained MAC is valid. Otherwise, the previously obtained MAC in the access request is invalid, and thus, processing logic denies access to the requested content and reports a MAC error (processing block 325). The presence of the MAC error may indicate either corruption of the MAC and/or an active attempt to subvert access control.

If the previously obtained MAC is valid, processing logic checks one or more of the access control tokens in the access request (processing block 332). Then processing logic determines if the client is authorized to access the content requested (processing block 335). In some embodiments, there is a token for each type of content. If the access request includes an appropriate token for the type of content requested, then the client is authorized to access the content requested. If the client is not authorized to access the content, then processing logic denies access and reports a lack of access control token error (processing block 337), which may likely be the result of someone getting lost in the web application and trying to find their way out with an URL surgery, or even an error (a.k.a. a bug) in the web application. Otherwise, processing logic serves the requested content to the client (processing block 340).

Figure 4:
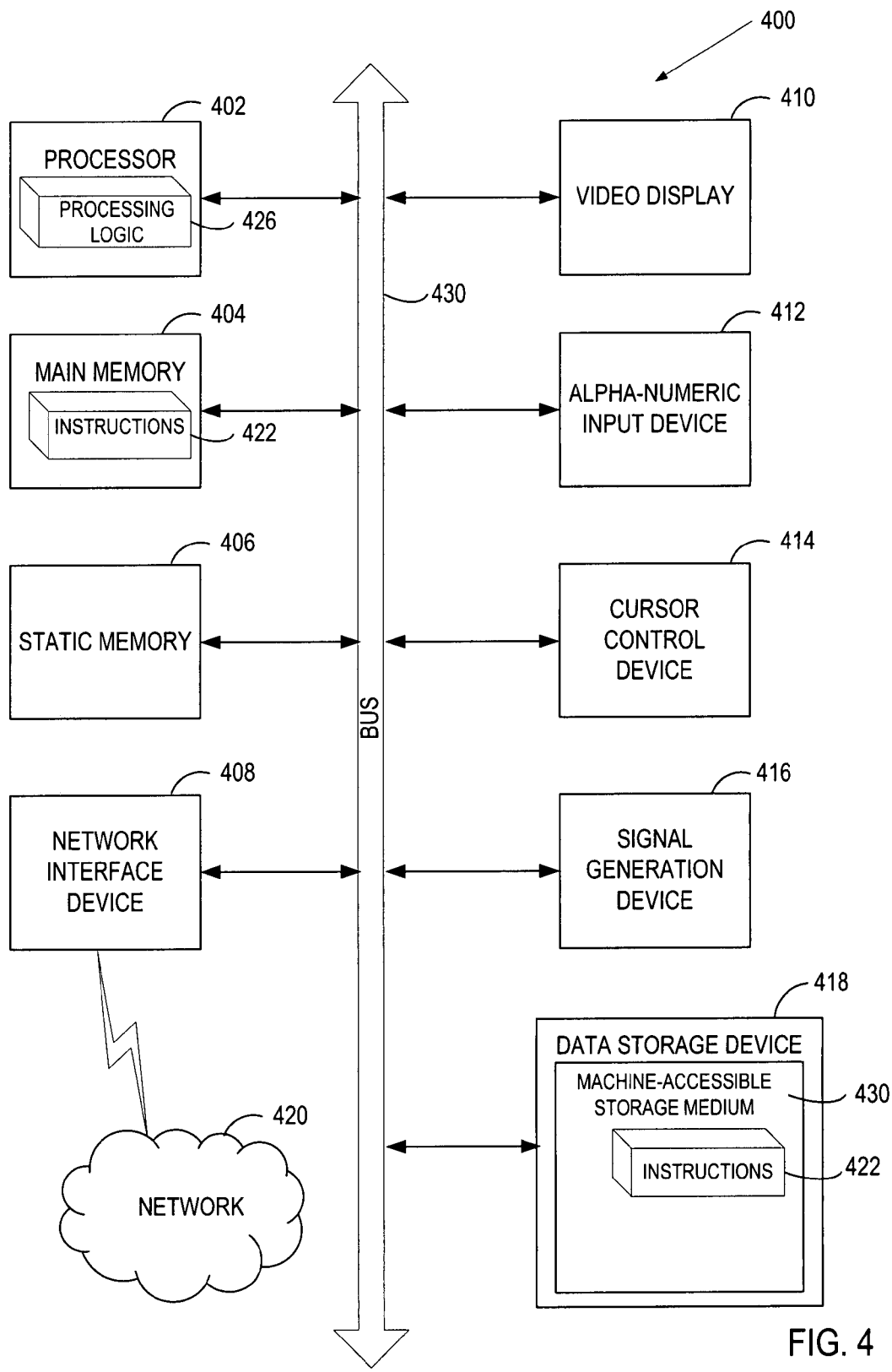
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to validate a web session in a proxy server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
generating, by a proxy server communicatively coupled between an application server and a client, a first message authentication code upon receiving a message generated by the application server in response to an authentication request to initiate a web session from the client, the message generated by the application server comprising an access control token that indicates a specific type of static content that the client is allowed to access, wherein the message generated by the application server does not include a message authentication code;
adding, by the proxy server, the first message authentication code and a timestamp to the message generated by the application server, wherein the timestamp signifies when the message generated by the application server has reached the proxy server, wherein the client uses the first message authentication code and the timestamp to request access to predetermined content during the web session;
during the web session, computing, by the proxy server, a second message authentication code based on one or more previously obtained access control tokens in an access request from the client;
using the proxy server to compare the second message authentication code computed against a third message authentication code in the access request;
validating the third message authentication code in the access request in response to the second message authentication code matching the third message authentication code; and
denying the access request in response to the second message authentication code being different from the third message authentication code.

2. The method of claim 1, further comprising:
sending the message from the proxy server to the client;
offloading service of the predetermined content from the application server to the proxy server; and
using the proxy server to control access to the predetermined content by the client during the web session.

3. The method of claim 1, further comprising:
using the proxy server to check an access control token within an access request from the client to determine if the client is authorized to access the predetermined content during the web session.

4. The method of claim 1, further comprising:
using the proxy server to serve the predetermined content to the client if a message authentication code within an access request from the client is validated and an access control token within the access request indicates that the client has been authorized to access the predetermined content.

5. The method of claim 1, further comprising:
denying the client access to the predetermined content if a message authentication code within an access request from the client is invalid.

6. The method of claim 1, further comprising:
denying the client access to the predetermined content if an access control token within an access request from the client indicates that the client is not authorized to access the predetermined content.

7. The method of claim 1, further comprising:
using the proxy server to issue a set of updated credentials to the client during the web session, the set of updated credentials comprising at least one of an updated message authentication code, an updated timestamp, and updated access control tokens.

8. The method of claim 1, wherein the predetermined content comprises static content.

9. A proxy server comprising:
a storage device to store instructions; and
a network interface, executable by a processing device, to retrieve the instructions and, in response to the instructions, to communicatively couple to a network to receive a message generated by an application server in response to an authentication request from a client to initiate a web session, the message comprising an access control token that indicates a specific type of static content that the client is allowed to access, wherein the message generated by the application server does not include a message authentication code; and
an authentication module, executable by the processing device, to add a timestamp to the message generated by the application server, wherein the timestamp signifies when the message generated by the application server has reached the proxy server, wherein the authentication module comprises a message authentication code computation module to generate a first message authentication code for the message generated by the application server, wherein the authentication module is to add the first message authentication code to the message generated by the application server, wherein the client uses the first message authentication code and the timestamp to request access to predetermined content during the web session, wherein the message authentication code computation module is further to compute, during the web session, a second message authentication code based on one or more previously obtained access control tokens in an access request from the client, to compare the second message authentication code computed against a third message authentication code in the access request, to validate the third message authentication code in the access request in response to the second message authentication code matching the third message authentication code, and to deny the access request in response to the second message authentication code being different from the third message authentication code.

10. The proxy server of claim 9, wherein the network interface is to send the message to the client via the network, and wherein the processing device further executes a content serving module to serve the predetermined content to the client during the web session, wherein the authentication module is further to control access to the predetermined content by the client during the web session.

11. The proxy server of claim 9, wherein the authentication module is to issue a set of updated credentials to the client during the web session, the set of updated credentials comprising at least one of an updated message authentication code, an updated timestamp, and an updated access control token.

12. The proxy server of claim 9, wherein the authentication module is to check an access control token within an access request from the client to determine if the client is authorized to access the predetermined content.

13. The proxy server of claim 9, wherein the content serving module serves the predetermined content to the client if a message authentication code within an access request from the client is validated and an access control token within the access request indicates that the client has been authorized to access the predetermined content.

14. The proxy server of claim 9, wherein the authentication module is to deny the client access to the predetermined content if a message authentication code within an access request from the client is invalid.

15. The proxy server of claim 9, wherein the authentication module is to deny the client access to the predetermined content if an access control token within an access request from the client indicates that the client is not authorized to access the predetermined content.

16. A system comprising the proxy server of claim 9, further comprising the application server and a backend server coupled to the application server.

17. A system comprising the proxy server of claim 9, wherein the predetermined content comprises static content, and the system further comprises:
a repository coupled to the proxy server, to store the static content.

18. A non-transitory machine-readable medium that provides instructions that, if executed by a processor, will cause the processor to perform operations comprising:
generating, by a proxy server comprising the processor and communicatively coupled between an application server and a client, a first message authentication code upon receiving a message generated by the application server in response to an authentication request to initiate a web session from the client, the message generated by the application server comprising an access control token that indicates a specific type of static content that the client is allowed to access, wherein the message generated by the application server does not include a message authentication code;
adding, by the proxy server, the first message authentication code and a timestamp to the message generated by the application server, wherein the timestamp signifies when the message generated by the application server has reached the proxy server, wherein the client uses the first message authentication code and the timestamp to request access to predetermined content during the web session;
during the web session, computing, by the proxy server, a second message authentication code based on one or more previously obtained access control tokens in an access request from the client;
using the proxy server to compare the second message authentication code computed against a third message authentication code in the access request;
validating the third message authentication code in the access request in response to the second message authentication code matching the third message authentication code; and
denying the access request in response to the second message authentication code being different from the third message authentication code.

19. The non-transitory machine-readable medium of claim 18, wherein the operations further comprise:
sending the message from the proxy server to the client;
offloading service of the predetermined content from the application server to the proxy server; and using the proxy server to control access to the predetermined content by the client during the web session.

20. The non-transitory machine-readable medium of claim 18, wherein the operations further comprise:

using the proxy server to check an access control token within an access request from the client to determine if the client is authorized to access the predetermined content during the web session.

21. The non-transitory machine-readable medium of claim 18, wherein the operations further comprise:

using the proxy server to serve the predetermined content to the client if a message authentication code within an access request from the client is validated and an access control token within the access request indicates that the client has been authorized to access the predetermined content.

22. The non-transitory machine-readable medium of claim 18, wherein the operations further comprise:

denying the client access to the predetermined content if a message authentication code within an access request from the client is invalid.

23. The non-transitory machine-readable medium of claim 18, wherein the operations further comprise:

denying the client access to the predetermined content if an access control token within an access request from the client indicates that the client is not authorized to access the predetermined content.

24. The non-transitory machine-readable medium of claim 18, wherein the operations further comprise:

using the proxy server to issue a set of updated credentials to the client during the web session, the set of updated credentials comprising at least one of an updated message authentication code, an updated timestamp, and updated access control tokens.

25. The non-transitory machine-readable medium of claim 18, wherein the predetermined content comprises static content.

* * * * *